United States Patent
Oetjen

(10) Patent No.: US 8,528,473 B2
(45) Date of Patent: Sep. 10, 2013

(54) SIGN PRESS AND METHOD FOR ASSEMBLING THE SAME

(76) Inventor: Joseph Edward Oetjen, St. Louis, MO (US)

(*) Notice: Subject to any disclaimer, the term of this patent is extended or adjusted under 35 U.S.C. 154(b) by 311 days.

(21) Appl. No.: 12/902,288

(22) Filed: Oct. 12, 2010

(65) Prior Publication Data

US 2011/0132210 A1    Jun. 9, 2011

Related U.S. Application Data

(60) Provisional application No. 61/267,674, filed on Dec. 8, 2009.

(51) Int. Cl.
  *B30B 9/00* (2006.01)
  *B30B 7/00* (2006.01)
(52) U.S. Cl.
  USPC ............................. 100/90; 100/233; 29/428
(58) Field of Classification Search
  USPC .................. 100/90, 233; 156/556, 542, 566, 156/580, 581; 29/428
  See application file for complete search history.

(56) References Cited

U.S. PATENT DOCUMENTS

| | | | |
|---|---|---|---|
| 3,119,922 A | 1/1964 | Mayhew | |
| 3,641,643 A | 2/1972 | Niemi | |
| 4,927,479 A | 5/1990 | Böck | |
| 4,983,487 A | 1/1991 | Gilreath | |
| 5,106,439 A | 4/1992 | Wellings et al. | |
| 5,250,146 A | 10/1993 | Horvath | |
| 5,281,293 A | 1/1994 | Frame et al. | |
| 5,733,410 A | 3/1998 | Gore et al. | |
| 6,220,331 B1 | 4/2001 | Matsuda et al. | |
| 2003/0183327 A1 | 10/2003 | Titze | |
| 2009/0277578 A1* | 11/2009 | Sung et al. | 156/285 |

* cited by examiner

*Primary Examiner* — Jimmy T Nguyen
(74) *Attorney, Agent, or Firm* — Armstrong Teasdale LLP

(57) ABSTRACT

A press and a method for assembling the same are provided. The press includes a first plate, a second plate, and a coupling portion. The first plate includes a first side, a second side, and a substantially convex surface extending therebetween. The convex surface includes a plurality of openings extending therethrough that provide a vacuum force. The second plate includes a first side, a second side, and a substantially flat surface extending therebetween. The coupling portion couples the first plate to the second plate such that the first side of the first plate and the first side of the second plate are substantially aligned.

20 Claims, 3 Drawing Sheets

SIGN PRESS AND METHOD FOR ASSEMBLING THE SAME

CROSS REFERENCE TO RELATED APPLICATIONS

This application claims benefit of U.S. Provisional Application No. 61/267,674, filed Dec. 8, 2009, which is hereby incorporated by referenced in its entirety.

FIELD OF THE INVENTION

The field of the invention relates generally to presses and, more particularly, to a sign press including a vacuum system and method for assembling the same.

BACKGROUND OF THE INVENTION

Known sign presses include a first plate and a second plate, wherein the first plate is pressed against the second plate to couple a first layer to a second layer. At least one known sign press includes a vacuum system that facilitates retaining the first layer against the first plate and the second layer against the second plate. Improper alignment of the first and second layers and/or adjustment of the first and second plates may result in an inadequate press.

BRIEF SUMMARY OF THE INVENTION

In one aspect, a press is provided. The press includes a first plate, a second plate, and a coupling portion. The first plate includes a first side, a second side, and a substantially convex surface extending therebetween. The convex surface includes a plurality of openings extending therethrough that provide a vacuum force. The second plate includes a first side, a second side, and a substantially flat surface extending therebetween. The coupling portion couples the first plate to the second plate such that the first side of the first plate and the first side of the second plate are substantially aligned.

In another aspect, a method is provided for assembling a press. The method includes providing a first plate and providing a second plate. The first plate includes a first side, a second side, and a substantially convex surface extending therebetween. The convex surface includes a plurality of openings extending therethrough that are configured to provide a vacuum force. The second plate has a first side, a second side, and a substantially flat surface extending therebetween. The first plate is coupled to the second plate using a coupling portion such that the first side of the first plate and the first side of the second plate are substantially aligned.

The features, functions, and advantages that have been discussed can be achieved independently in various embodiments of the present invention or may be combined in yet other embodiments further details of which can be seen with reference to the following description and drawings.

DETAILED DESCRIPTION OF THE INVENTION

Figure 1:
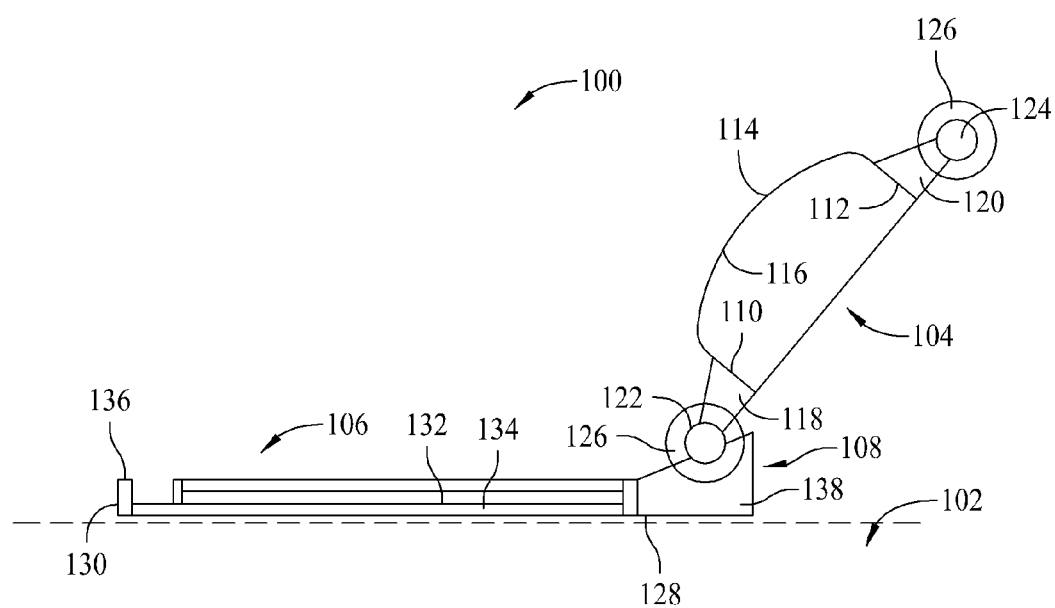
FIG. 1 is a front side perspective view of a press according to an exemplary embodiment of the present invention.
Figure 2:
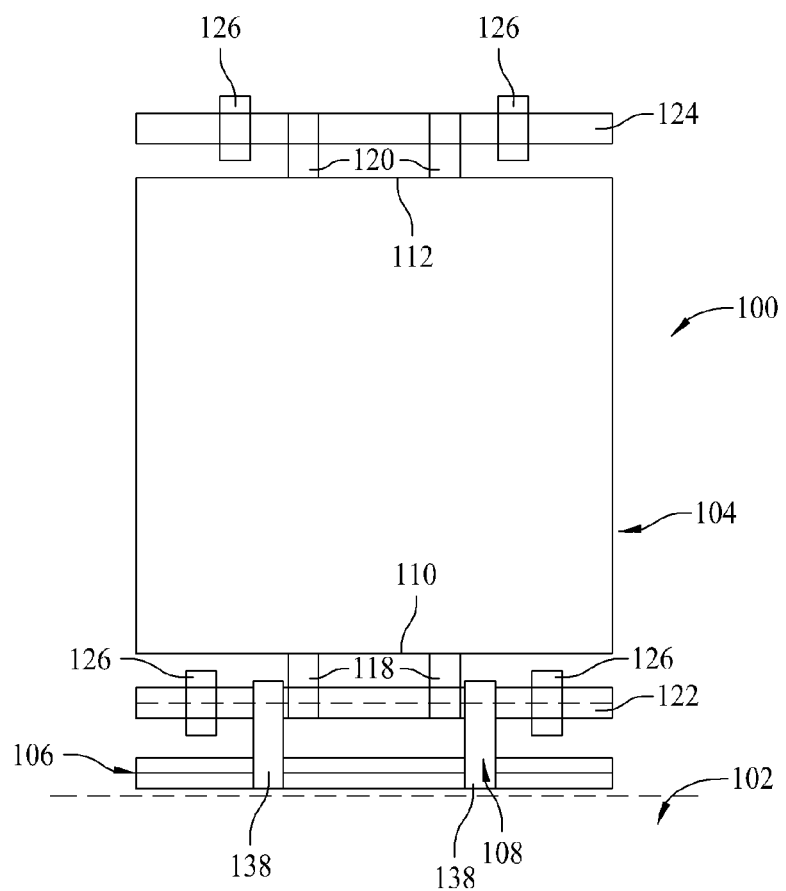
FIG. 2 is a right side perspective view of the press shown in FIG. 1.

FIGS. 1 and 2 show a sign press 100 positioned on a supporting surface 102. Sign press 100 includes a first plate 104 and a second plate 106. Second plate 106 includes at least one coupling portion 108 that is configured to couple second plate 106 to first plate 104. Sign press 100 is configured to press a vinyl layer (not shown) onto a substrate (not shown). More specifically, the vinyl layer is positioned on first plate 104, the substrate is positioned on second plate 106, and sign press 100 is configured to press the vinyl layer onto the substrate.

Figure 3:
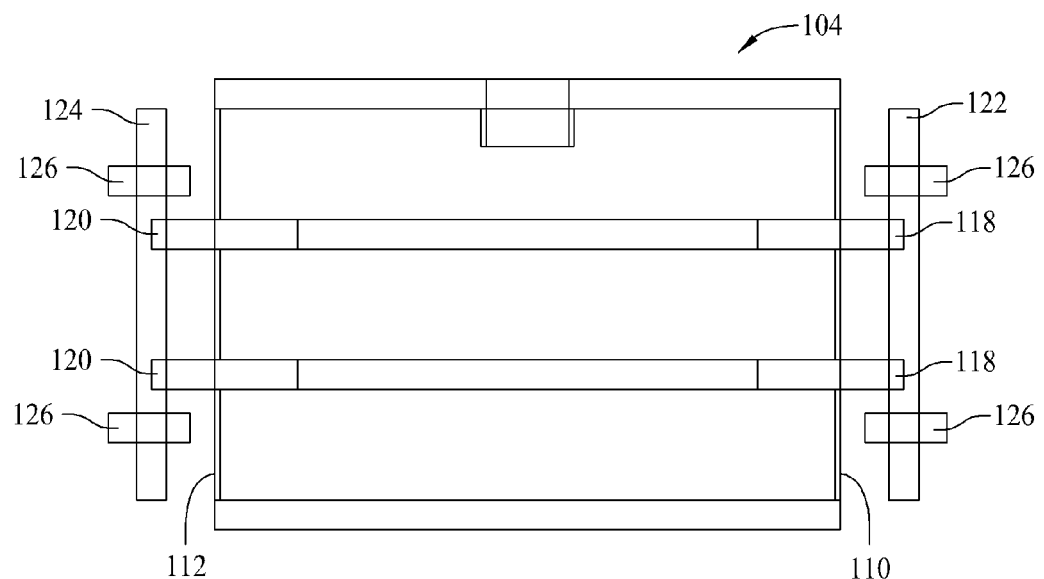
FIG. 3 is a top perspective view of a first plate of the press shown in FIG. 1.
Figure 4:
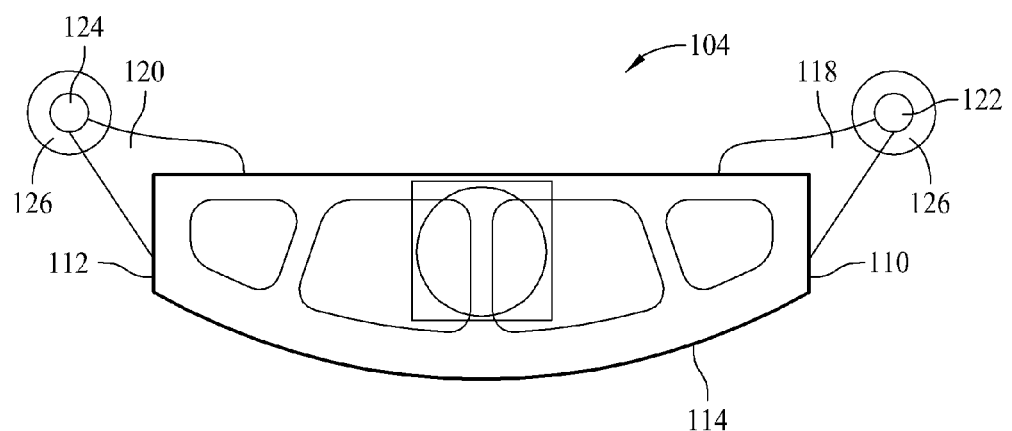
FIG. 4 is a front side perspective view of the first plate shown in FIG. 3.
Figure 5:
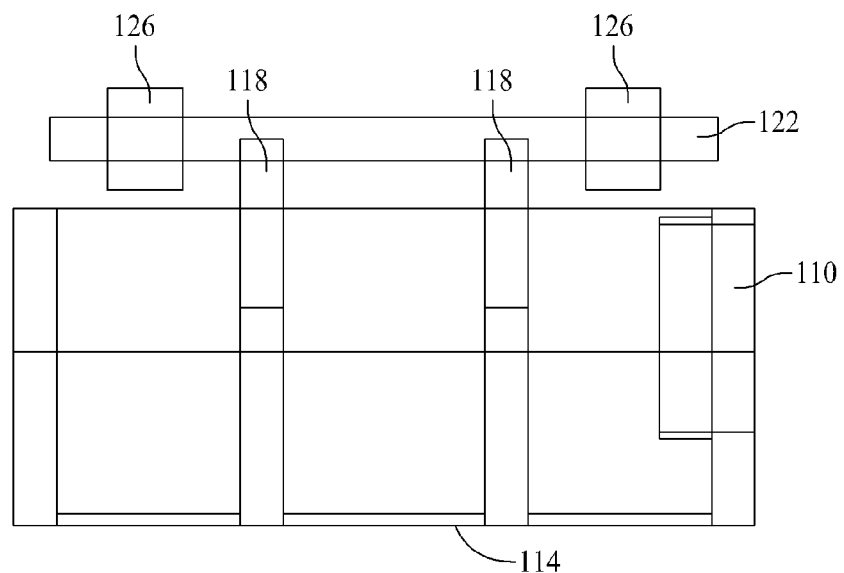
FIG. 5 is a right side perspective view of the first plate shown in FIG. 3.

FIGS. 3-5 show first plate 104 having a first side 110, an opposing second side 112, and a bottom surface 114 that extends from first side 110 to second side 112. In the exemplary embodiment, first plate 104 is oriented such that bottom surface 114 faces second plate 106. In the exemplary embodiment, bottom surface 114 is fabricated from a tolerant material, such as rubber, that facilitates applying a uniform pressure across an uneven surface to reduce a probability of forming air bubbles between the vinyl layer and the substrate.

Bottom surface 114 includes a substantially convex profile having a substantially consistent arc that extends from first side 110 to second side 112. The substantially consistent arc of bottom surface 114 enables moving first plate 104 across second plate 106 in a rolling motion to facilitate reducing a probability of forming air bubbles between the vinyl layer and the substrate.

Bottom surface 114 defines a plurality of openings 116 that are configured to provide an adjustable vacuum force on bottom surface 114 to facilitate retaining various sizes of vinyl layers. More particularly, in the exemplary embodiment, first plate 104 is configured to be coupled to a vacuum device (not shown) that is configured to pull air from openings 116 to create the vacuum force on bottom surface 114. In the exemplary embodiment, openings 116 are evenly distributed across bottom surface 114 such that bottom surface 114 is configured to retain the vinyl layer with a substantially uniform vacuum force.

In one embodiment, the vacuum force may be increased to retain a relatively large vinyl layer and/or decreased to retain a relative small vinyl layer. Additionally or alternatively, each opening 116 may be selectively openable and/or closeable, such that a portion of bottom surface 114 has a vacuum force. For example, in such an embodiment, first plate 104 includes a control mechanism (not shown) such as, without limitation, a knob, a slide, and/or a lever that is configured to selectively open and/or close at least one opening 116. In such an embodiment, selectively opening and/or closing openings 116 may adjust the vacuum force at desired portions of bottom surface 114 independent of adjusting the vacuum force at the vacuum device.

First plate 104 includes at least one first flange 118 that extends from first side 110 and at least one second flange 120 that extends from second side 112. In the exemplary embodiment, a first handle 122 is coupled to first flange 118, and a second handle 124 is coupled to second flange 120. In an alternate embodiment, handles 122 and 124 are coupled to any suitable location of first plate 104. Handles 122 and 124 facilitate handling first plate 104. Notably, in the exemplary embodiment, handles 122 and 124 perform substantially similar functions and may be used interchangeably within the detailed description of the invention. In the exemplary embodiment, each handle 122, 124 includes at least one spacer 126 that enables maintaining a distance between the respective handle 122, 124 and supporting surface 102.

Figure 6:
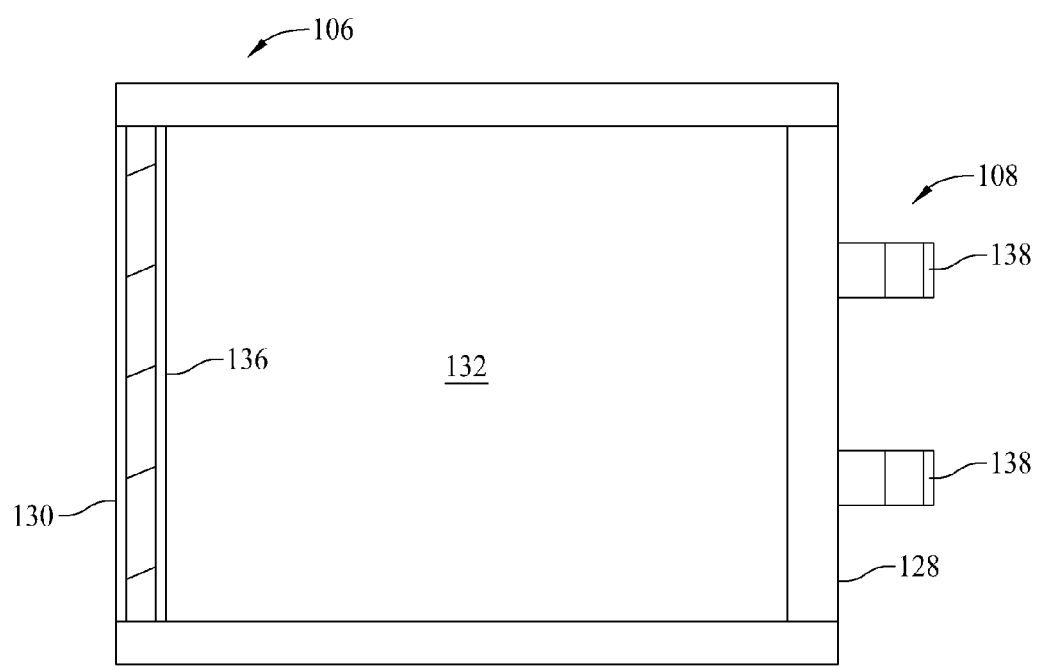
FIG. 6 is a top perspective view of a second plate of the press shown in FIG. 1.

FIG. 6 shows second plate 106 having a first side 128, an opposing second side 130, and a top surface 132 that extends from first side 128 to second side 130. In the exemplary embodiment, second plate 106 is oriented such that top surface 132 faces first plate 104 and, more specifically, bottom surface 114.

Top surface 132 has a substantially flat profile. In the exemplary embodiment, top surface 132 includes a plurality of fillers 134. Fillers 134 are configured to provide a suitable thickness for top surface 132 to employ various substrate thicknesses ranging from 10 mil (0.01 in.) to three-fourths of an inch (0.75 in.).

In one embodiment, at least one filler 134 and/or substrate may be moveable between a first position and a second position, such that the at least one filler 134 and/or substrate is easily accessible to a user for installation and/or withdrawal in the first position, and the at least one filler 134 and/or substrate is suitably retained for use on second plate 106 in the second position. For example, second plate 106 may include a centering device (not shown) coupled to an actuator (not shown) such as, without limitation, a pedal that is configured to selectively move the at least one filler 134 and/or substrate between the first position and the second position.

Second plate 106 includes a retaining mechanism 136 configured to secure the substrate on top surface 132. More specifically, retaining mechanism 136 is a spring-loaded arm that is suitably securable in various positions to facilitate retaining various sizes of substrates. In the exemplary embodiment, retaining mechanism 136 is coupled along second side 130. In an alternate embodiment, retaining mechanism 136 is coupled to any suitable location of second plate 106.

Coupling portion 108 enables sign press 100 to be convertible between a first configuration and a second configuration. Coupling portion 108 includes at least one flange 138 that is configured to be coupled to one of first handle 122 and second handle 124. More specifically, in the first configuration, coupling portion 108 is configured to couple to first side 110 of first plate 104 via first handle 122. In the second configuration, coupling portion 108 is configured to couple second side 112 of first plate 104 via second handle 124.

Sign press 100 is positionable between an open configuration and a closed configuration. More specifically, in the open configuration, first plate 104 is positioned at an obtuse angle with respect to second plate 106, wherein handle 122 is the vertex. Additionally, in the closed configuration, first plate 104 is positioned at a negative angle with respect to second plate 106, wherein handle 122 is the vertex.

During operation, the vacuum device pulls air from openings 116 defined by bottom surface 114 to create the vacuum force on bottom surface 114. With sign press 100 in the open configuration, the vinyl layer is positioned on bottom surface 114 and is retained by the vacuum force. More specifically, the vinyl layer has a finished side and an adhesive side, and the finished side of the vinyl layer is positioned directly against bottom surface 114 such that the adhesive side of the vinyl layer faces away from bottom surface 114.

The substrate is positioned on top surface 132 and is retained by retaining mechanism 136. More specifically, in the exemplary embodiment, at least one filler 134 provides a suitable thickness for top surface 132, and the substrate is placed on top surface 132. Moreover, in the exemplary embodiment, retaining mechanism 136 retains the substrate against top surface 132 such that the substrate is restricted from lateral movement.

With the vinyl layer and the substrate secured by first plate 104 and second plate 106, respectively, sign press 100 presses bottom surface 114 towards top surface 132. More specifically, in the exemplary embodiment, the convex profile of first plate 104 facilitates pressing the vinyl layer against the substrate along a line of pressure that is parallel to handle 122.

First plate 104 moves in a rolling motion such that the line of pressure moves from first sides 110, 128 to second sides 112, 130 to reduce a probability of forming air bubbles between the vinyl layer and the substrate. As the line of pressure presses the adhesive side of the vinyl layer against the substrate, the vinyl layer detaches from bottom surface 114 and couples to the substrate because the adhesive force between the vinyl layer and the substrate is greater than the vacuum force retaining the vinyl layer against bottom surface 114.

Sign press 100 is moved from the open configuration to the closed configuration such that first plate 104 is rotated about handle 122. As sign press 100 moves from the open configuration to the closed configuration, coupling portion 108 is configured to move handle 122 in an upward direction such that a distance from first side 110 of first plate 104 moves away from first side 128 of second plate 106. Moreover, as sign press 100 moves from the closed configuration to the open configuration, coupling mechanism is configured to move handle 122 in a downward direction such that first side 110 of first plate 104 moves toward first side 128 of second plate 106.

To facilitate pressing the adhesive side of the vinyl layer against the substrate, sign press 100 may be converted between the first and second configurations. For example, in the exemplary embodiment, to convert sign press 100 from the first configuration to the second configuration, coupling portion 108 is decoupled from first side 110 and positioned along second side 112. More specifically, coupling portion 108 is coupled to second side 112 of first plate 104 via second handle 124. Moreover, in the exemplary embodiment, to convert sign press 100 from the second configuration to the first configuration, coupling portion 108 is decoupled from second side 112 and positioned along first side 110. More specifically, coupling portion 108 is coupled to first side 110 of first plate 104 via first handle 122.

After sign press 100 has fully pressed the vinyl layer onto the substrate, sign press 100 is returned to the open configuration and the coupled vinyl layer and substrate are removed from sign press 100.

Exemplary embodiments of the press and methods for assembling the same are described above in detail. The methods and systems are not limited to the specific embodiments described herein, but rather, components of the systems and steps of the methods may be utilized independently and separately from other components and/or steps described herein. For example, the methods and systems described herein may have other industrial and/or consumer applications and are not limited to practice with presses as described herein. Rather, one or more embodiments described herein may be implemented and utilized in connection with many other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A press comprising:
    a first plate having a first side, a second side, and a substantially convex surface extending therebetween, said convex surface including a plurality of openings extending therethrough that provide a vacuum force;
    a second plate having a first side, a second side, and a substantially flat surface extending therebetween;
    a coupling portion coupling said first plate to said second plate such that the first side of said first plate and the first side of said second plate are substantially aligned; and
    a first handle coupled to the first side of said first plate.

2. A press in accordance with claim 1, wherein said plurality of openings are substantially evenly distributed about said convex surface.

3. A press in accordance with. claim 1, wherein the vacuum force provided by the plurality of openings is selectively adjustable.

4. A press in accordance with claim 1, wherein at least one of said plurality of openings is selectively openable to facilitate adjusting the vacuum force at a desired portion of said convex surface.

5. A press in accordance with claim 1 further comprising a second handle coupled to the second side of said first plate.

6. A press in accordance with claim 5, wherein said first plate is configured to rotate between an open configuration and a closed configuration about at least one of said first handle and said second handle.

7. A press in accordance with claim 5, wherein said first handle is configured to move vertically in a first direction, and said second handle is configured to move vertically in a second direction that is opposite the first direction when said press is in a closed configuration.

8. A press in accordance with claim 1 further comprising a centering device coupled to said second plate, said centering device configured to selectively move a substrate between a first position and a second position.

9. A press in accordance with claim 1 further comprising a retaining mechanism coupled to said second plate, said retaining mechanism configured to retain a substrate proximate to said second plate.

10. A press in accordance with claim 9, wherein said retaining mechanism is a spring-loaded arm that is selectively secureable.

11. A method for assembling a press, said method comprising:
    providing a first plate having a first side, a second side, and a substantially convex surface extending therebetween, wherein the convex surface includes a plurality of openings extending therethrough that are configured to provide a vacuum force;
    providing a second plate having a first side, a second side, and a substantially flat surface extending therebetween;
    coupling the first plate to the second plate using a coupling portion such that the first side of the first plate and the first side of the second plate are substantially aligned; and
    coupling a first handle to the first side of the first plate.

12. A method in accordance with claim 11, wherein providing a first plate further comprises substantially evenly distributing the plurality of openings across the convex surface.

13. A method in accordance with claim 11 further comprising coupling a vacuum to the first plate, wherein the vacuum is configured to selectively adjust the vacuum force provided by the plurality of openings.

14. A method in accordance with claim 11 further comprising selectively opening at least one of the plurality of openings to facilitate adjusting the vacuum force at a desired portion of the convex surface.

15. A method in accordance with claim 11 further comprising
    coupling a second handle to the second side of the first plate.

16. A method in accordance with claim 15, wherein coupling the first plate to the second plate further comprises configuring the first plate to rotate between an open configuration and a closed configuration about at least one of the first handle and the second handle.

17. A method in accordance with claim 15, wherein coupling the first plate to the second plate further comprises configuring the first handle to move vertically in a first direction, and the second handle to move vertically in a second direction that is opposite the first direction when the press is in a closed configuration.

18. A method in accordance with claim 11 further comprising coupling a centering device to the second plate, the centering device configured to selectively move a substrate between a first position and a second position.

19. A method in accordance with claim 11 further comprising coupling a retaining mechanism to the second plate, the retaining mechanism configured to retain a substrate proximate to the second plate.

20. A method in accordance with claim 19, wherein coupling a retaining mechanism further comprises providing the retaining mechanism with a spring-loaded arm that is selectively secureable.

* * * * *